(12) United States Patent  (10) Patent No.: US 9,347,599 B2
Laffont  (45) Date of Patent: May 24, 2016

(54) SUPPORT SYSTEM FOR AN EQUIPMENT ITEM ON A CONCRETE SLAB

(71) Applicant: ALSTOM Technology Ltd, Baden (CH)

(72) Inventor: Patrick Laffont, Montrouge (FR)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 14/514,723

(22) Filed: Oct. 15, 2014

(65) Prior Publication Data

US 2015/0028183 A1   Jan. 29, 2015

Related U.S. Application Data

(63) Continuation of application No. PCT/EP2013/058216, filed on Apr. 19, 2013.

(30) Foreign Application Priority Data

Apr. 19, 2012 (FR) ..................... 12 53591

(51) Int. Cl.
F16M 5/00 (2006.01)
F16M 9/00 (2006.01)
E02D 27/44 (2006.01)
F16M 7/00 (2006.01)
B23Q 1/00 (2006.01)

(52) U.S. Cl.
CPC ................ *F16M 5/00* (2013.01); *E02D 27/44* (2013.01); *F16M 7/00* (2013.01); *F16M 9/00* (2013.01); *B23Q 1/0054* (2013.01); *F16M 2200/08* (2013.01); *Y10T 29/49826* (2015.01)

(58) Field of Classification Search
CPC ....... F16M 5/00; F16M 7/00; F16M 2200/08; F16M 9/00; F16M 11/24; E02D 27/44; E02D 27/50; E02D 27/016; B23Q 1/0054; B23Q 1/015; Y10T 29/49826; B29C 67/243; E04F 15/02464; E04F 15/02476
USPC ............... 248/679, 637, 678; 249/10; 52/298, 52/126.6, 126.7, 294, 295, 742.14, 414, 52/745.2
See application file for complete search history.

(56) References Cited

U.S. PATENT DOCUMENTS

| 5,165,651 A * | 11/1992 | Welch ................... B29C 67/243 248/346.01 |
| 6,164,615 A * | 12/2000 | Basham .................. B28B 1/008 248/346.01 |
| 8,950,136 B2 * | 2/2015 | Haidvogl ................ E02D 27/44 52/294 |
| 9,068,320 B2 * | 6/2015 | Takagi ................ E04D 13/1407 |
| 2003/0014926 A1 * | 1/2003 | Champa .............. E04D 13/1407 52/60 |
| 2006/0156660 A1 | 7/2006 | Stateson |
| 2012/0228466 A1 * | 9/2012 | Haidvogl ................ E02D 27/44 248/679 |
| 2014/0311068 A1 * | 10/2014 | Takagi ................ E04D 13/1407 52/295 |

FOREIGN PATENT DOCUMENTS

| DE | 94 07 532 U1 | 7/1994 |
| JP | 59138619 A | 8/1984 |
| JP | 59185231 A | 10/1984 |
| WO | 02/077391 A2 | 10/2002 |
| WO | 2011/047401 A2 | 4/2011 |

* cited by examiner

*Primary Examiner* — Anita M King

(57) ABSTRACT

A support system for an equipment item on a concrete slab includes at least one raised block relative to the slab and of a single piece with the slab. The block includes a metal belt delimiting the vertical walls of the block and a metal support fastened to the belt and capping the block to receive a foot of the equipment item.

9 Claims, 4 Drawing Sheets

SUPPORT SYSTEM FOR AN EQUIPMENT ITEM ON A CONCRETE SLAB

CROSS-REFERENCE TO RELATED APPLICATIONS

This application claims priority to PCT/EP2013/058216 filed Apr. 19, 2013, which claims priority to French application 1253591 filed Apr. 19, 2012, both of which are hereby incorporated in their entireties.

TECHNICAL FIELD

The present invention relates to a support system for an equipment item on a concrete slab in a machine room of a power station. It also relates to a method for producing such a system.

BACKGROUND

In the electrical engineering production installations, equipment items are installed in a machine room of a power station. Such equipment items comprise, for example, heat exchangers, reheaters or pumps. Some equipment items take the form of a large cylinder that extends horizontally. Two feet are provided close to each of the ends to place the equipment item on a slab of the installation. The slab can be produced directly on the ground or be a floor between two rooms. These equipment items are very heavy, their weight being of the order of tens or even hundreds of tons.

It is generally planned to install these equipment items at the time of the construction of the building which shelters them. The concrete slab is first of all poured, the equipment item is put in place then a further floor on top of the equipment item is produced.

It is planned to place the equipment item on plinths made of a single piece with the slab, each plinth supporting a foot of the equipment item. The top surface of this plinth has to be of good geometrical quality. Furthermore, it must include anchoring elements in order to establish a mechanical link between the foot and the plinth. These elements must be positioned accurately in order to correspond to the geometry of the equipment item.

For this, provision is made to produce the plinth with formwork so that the plinth can be poured at the same time as the slab. A reservation is also provided in the top part of the plinth. Then, the anchoring elements are placed accurately in the reservation and in a second phase, concrete is poured to fix the anchoring elements. The equipment item is then put in place when concrete has hardened sufficiently.

This method therefore entails two concrete pouring phases, each time with waiting times for the hardening which are measured in weeks. Now, it is important not to delay the construction work site, in particular the construction of the upper floor which can be done only when the equipment items are in place.

The invention aims to provide a support system for an equipment item on a concrete slab which is quick to implement, while retaining the equipment item positioning accuracy.

SUMMARY

With these objectives in view, the subject of the invention is a support system for an equipment item on a concrete slab comprising at least one raised block relative to the slab and of a single piece with the slab, wherein the block includes a metal belt delimiting the vertical walls of the block and a metal support fastened to the belt and capping the block to receive a foot of the equipment item.

By producing the block with a metal belt, a means is available to fasten the support thereto in the desired position, in particular altitude-wise, and without it being necessary to carry out a second concrete pouring phase. The equipment items can therefore be placed at the right altitude with no second concrete pouring phase, which makes it possible to accelerate the completion of the work site.

According to an additional feature, the belt includes connection means protruding inward to link the belt to the concrete. The mechanical link between the belt and the concrete of the block is thus perfectly assured.

According to one embodiment, the connection means are studs welded onto the belt. This technique is more than adequately proven and makes it possible to obtain the desired result. The studs generally have a cylindrical body and a head that is wider than the body. The body is welded at the end, at right angles to the internal surface of the belt. The block is optionally complemented with conventional concrete reinforcement, but in most case, the reinforcement of the block is not necessary.

According to a particular arrangement, the support comprises drop edges at its periphery, the drop edges surrounding the belt and being fastened thereto by welding. The support can be adjusted in position by sliding vertically over the belt. Once the position is adjusted, the drop edges are welded onto the belt, which ensures an excellent mechanical link between the belt and the support, with the desired position accuracy.

To support equipment items comprising two feet, the support system comprises, for example, two blocks distributed over the slab in a main direction, one of the blocks comprising sliding means for the foot that it supports to slide on the block in the main direction. The system is thus able to accept a longitudinal expansion of the equipment item.

According to a particular constructive arrangement, the sliding means comprise two rules extending in the longitudinal direction along two parallel guiding faces of the foot. In addition to bearing the foot on the support, the two rules limit the possibilities of the foot slipping sideways, while leaving the foot free to slide on the support in the main direction.

According to a refinement, at least one of the rules also comprises a tab overhanging a corner face of the foot forming an angle with the correspond guiding face to prevent any lifting of the foot. In addition to the lateral guiding, the rule thus provided with a tab prevents lifting of the foot, so as to ensure the link even in the event of an earthquake.

Another subject of the invention is a method for producing a support system for an equipment item whereby the following steps are carried out:

installation of a formwork to delimit a block on top of a slab, and reinforcement for the slab and the block, and pouring of concrete for the slab and into the block formwork, the method wherein the formwork is a metal belt, and, after the pouring and the hardening of the concrete, a metal support capping the block to receive a foot of the equipment item is then fastened to the belt.

According to this method, there is only one concrete pouring step. The support system is thus available more rapidly than in the prior art, according to which two concrete pouring steps were needed. This production method is therefore more rapid.

According to other features of the method:
- the belt is equipped first with connection means between the belt and the concrete;
- the support is fastened to the belt by welding after its position has been set;
- the foot is fastened onto the support by welding; this operation does not require any particular preparation of the support or of the foot and it produces a total link between the foot and the support.

BRIEF DESCRIPTION OF THE DRAWINGS

The invention will be better understood and other particular features and advantages will become apparent on reading the following description, the description referring to the appended drawings in which.

DETAILED DESCRIPTION

Figure 1:
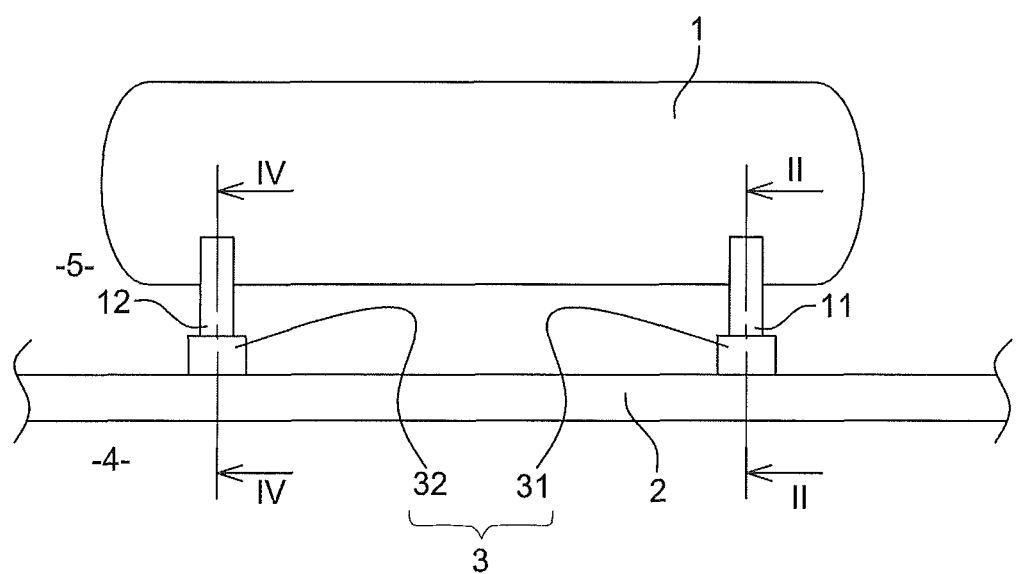
FIG. 1 is a side view of an equipment item and of the support system of the invention.

The support system 3 of the invention is implemented for an equipment item 1 as shown schematically in FIG. 1. Such an equipment item 1 is of cylindrical form and comprises two feet 11, 12 close to its two ends. Such an equipment item 1 is generally made of steel by boiler making operations.

The feet 11, 12 comprise vertical webs and baseplates 33, 33' having a planar surface 330, 330' oriented downward.

The support system 3 comprises two blocks 31, 32 intended to receive, respectively, the two feet 11, 12. The blocks 31, 32 are of a single piece with a concrete slab 2 which forms a separating floor between a room below 4, under the floor, and a room above 5 in which the equipment item 1 is placed. The blocks 31, 32 have a rectangular parallelepipedal form protruding from the slab 2.

Figure 2:
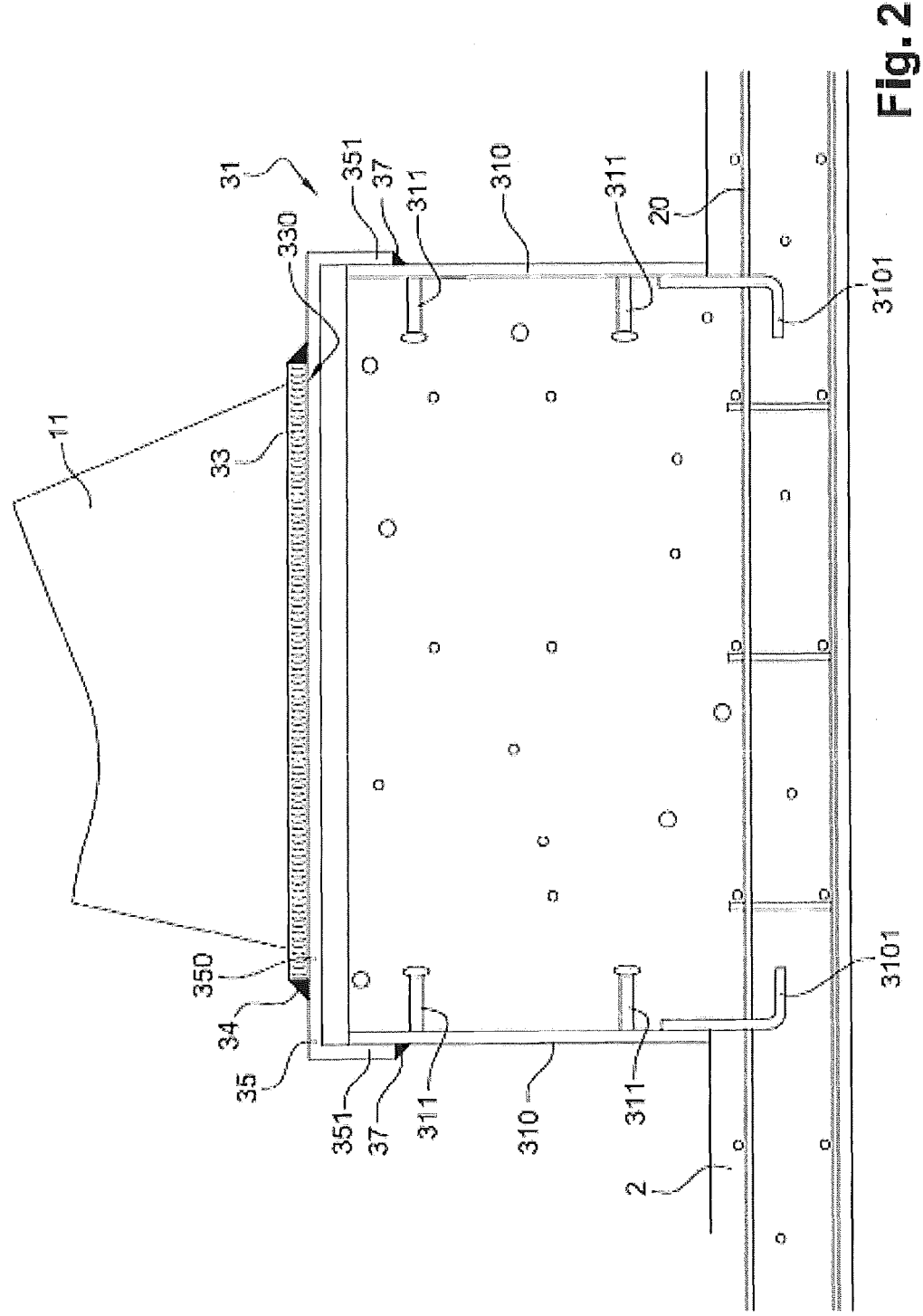
FIG. 2 is a partial cross-sectional view along the line II-II of FIG. 1.
Figure 3:
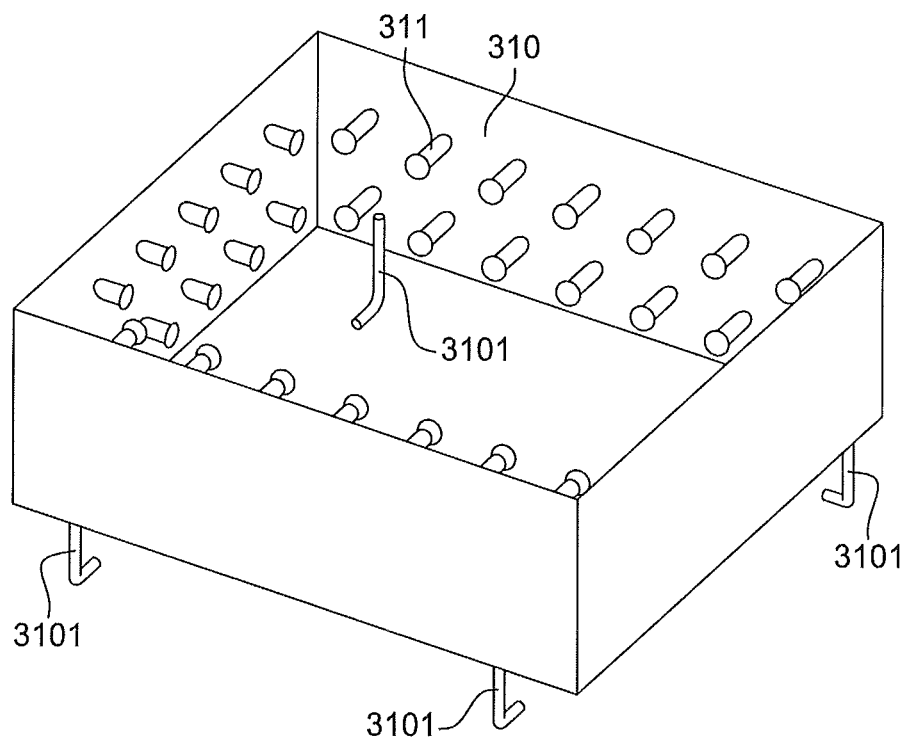
FIG. 3 is a perspective view of a belt used for the support system of FIG. 1.

Referring to FIG. 2, the block 31 is surrounded by a metal belt 310, for example made of steel. As FIG. 3 shows, the belt comprises rows of welded studs 311 protruding inward from the belt 310. The welded studs technique is widely known and used, in particular for the construction of hybrid bridges comprising steel girders and concrete aprons. It will not be detailed more here. The metal belt 310 also comprises anchor bars 3101 extending downward and intended to produce the anchorage for the block 31, 32 in the concrete of the slab 2.

The space delimited by the belt is filled with concrete 312 in continuity with the concrete of the slab 2.

The block 31 also comprises a support 35 comprising a metal plate 350, for example made of steel, and drop edges 351, of the same nature. The drop edges 351 extend vertically along the metal belt 310 and are fastened thereto by welding. A space is retained between the top part of the concrete of the block 31 and the plate 350. The block 32 is produced in the same way as the block 31 and comprises a support 35' comprising a plate 350'.

Figure 4:
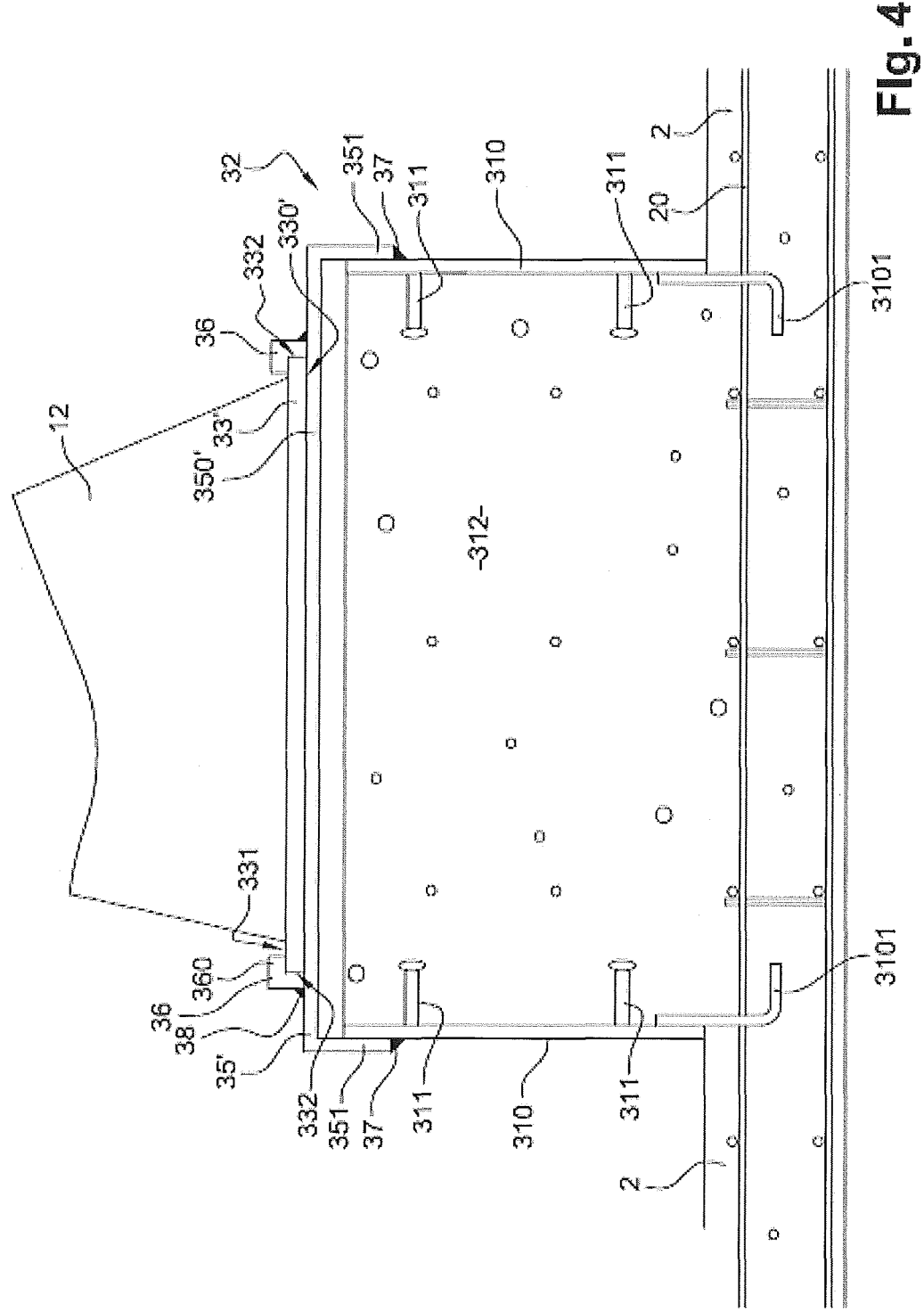
FIG. 4 is a cross-sectional view along the line IV-IV of FIG. 1.

The baseplate 33 rests on the support 35 and is fastened thereto by welding for a first of the two feet 11, either continuously, as shown in FIG. 2, or discontinuously. For the case of the second foot 12, shown in FIG. 4, the baseplate 33' rests on the support 35', but without being fastened thereto. Instead, the support system 3 comprises two rules 36 extending in the main direction along the edges of the baseplate 33', facing guiding faces 332. Furthermore, each rule 36 comprises a tab 360 overhanging the baseplate 33' facing a corner face 331 of the foot forming an angle with the guiding face 332. The tabs 360 thus form an obstacle to any lifting of the second foot 12.

For the production of the support system 3, during the preparation of the slab 2, the belts 310 are placed in the appropriate positions and reinforcement 20 is put in place. Then, the concrete of the slab 2 and that of the blocks 31, 32 is poured inside the belts 310. As soon as the blocks 31, 32 are accessible, the supports 35, 35' are put in place by adjusting their position, in particular their level. While maintaining this position, it is fastened by producing weld beads 37 between the drop edges 351 and the belt 310. It goes without saying that the length and the size of the beads 37 is sufficient to transmit the forces to be supported by the support 35, 35'. The weld beads 37 may be continuous, as represented, or discontinuous.

Then, the equipment item 1 is put in place such that the feet 11, 12 bear on the supports 35, 35'. The position of the equipment item 1 is adjusted, then weld beads 34 are produced on the periphery of the baseplate 33 to fasten the baseplate 33 onto the support 35 of the first foot 11. With regard to the second foot 12, the rules 36 are put in place along the guiding faces 332 of the baseplate 33' and they are also fastened by weld beads 38 onto the support 35'.

In operation, the equipment item 1 is likely to expand, in particular if it is passed through by fluids at medium and high temperature. This expansion is translated into a variable distance between the two feet 11, 12. When this distance varies, the baseplate 33' of the second foot 12 slides on the support 35' by being guided by the rules 36.

In case of earthquake, the first block 11 takes up the stresses in any direction. On the second block 12, the rules 36 prevent the lateral displacement, the tabs 360 prevent the lifting, whereas the longitudinal stresses are taken up by the first block 11.

The invention is not limited to the embodiment which has just been described by way of example. The form of the equipment item may be different. It may have only one foot, or, on the contrary, more than two feet. In the latter case, only one will be fixed, the others being designed to slide.

The invention claimed is:

1. A support system for an equipment item on a concrete slab comprising:
    at least one raised block relative to the concrete slab and the at least one raised block of a single piece with the concrete slab;
    a metal belt delimiting vertical walls of the at least one raised block; and
    a metal support fastened to the metal belt for capping the at least one raised block, with the metal support equipped to receive a foot of the equipment item, and including drop edges at a periphery of the metal support, with the drop edges surrounding the metal belt and fastened to the metal belt by welding.

2. The system as claimed in claim 1, wherein the metal belt includes connecting means protruding inwardly to link the metal belt to the concrete slab.

3. The system as claimed in claim 1, wherein the connecting means are studs welded onto the metal belt.

4. The system as claimed in claim 1, wherein two raised blocks of the at least one raised block are distributed on the concrete slab in a main direction, one of the raised blocks including sliding means for the foot of the equipment item that the block supports to slide the foot of the equipment item on the block in the main direction.

5. The system as claimed in claim 4, wherein the sliding means includes two rules extending in a longitudinal direction along two parallel guiding faces of the foot.

6. The system as claimed in claim 5, wherein at least one of the rules also includes a tab overhanging a corner face of the foot to form an angle with a corresponding guiding face to prevent any lifting of the foot.

7. A method for producing a support system for an equipment item, the method comprising:
- installing a formwork forming a metal belt to delimit a block on a top of a slab, with reinforcement for the slab and the block;
- pouring to form the slab and the block delimited within the formwork of concrete; and
- fastening to the metal belt
  - a metal support to cap the block, with the metal support equipped to receive a foot of the equipment item and including drop edges at a periphery of the metal support, with the drop edges surrounding the metal belt and being fastened to the metal belt by welding.

8. The method as claimed in claim 7, wherein the metal belt is equipped with connecting means between the metal belt and the concrete slab and block.

9. The method as claimed in claim 7, wherein the metal support is fastened to the metal belt by welding after the metal support's positioning has been set.

\* \* \* \* \*